United States Patent
Ohkubo

(10) Patent No.: US 10,579,555 B2
(45) Date of Patent: Mar. 3, 2020

(54) ELECTRONIC CONTROL UNIT AND DATA TRANSMISSION METHOD

(71) Applicant: TOYOTA JIDOSHA KABUSHIKI KAISHA, Toyota-shi, Aichi-ken (JP)

(72) Inventor: Norihito Ohkubo, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/819,744

(22) Filed: Nov. 21, 2017

(65) Prior Publication Data

US 2018/0165230 A1 Jun. 14, 2018

(30) Foreign Application Priority Data

Dec. 12, 2016 (JP) ................. 2016-240684

(51) Int. Cl.
G06F 13/16 (2006.01)
G06F 13/42 (2006.01)
G06F 13/18 (2006.01)

(52) U.S. Cl.
CPC .......... *G06F 13/1673* (2013.01); *G06F 13/18* (2013.01); *G06F 13/42* (2013.01)

(58) Field of Classification Search
None
See application file for complete search history.

(56) References Cited

U.S. PATENT DOCUMENTS

2015/0212958 A1 7/2015 Hara

FOREIGN PATENT DOCUMENTS

| JP | 2006-186569 A | 7/2006 |
|---|---|---|
| JP | 2010245793 A | 10/2010 |
| JP | 2014-033339 A | 2/2014 |

*Primary Examiner* — Idriss N Alrobaye
*Assistant Examiner* — Dayton Lewis-Taylor
(74) *Attorney, Agent, or Firm* — Hunton Andrews Kurth LLP

(57) ABSTRACT

An electronic control unit connected to a communication line, the electronic control unit including: a transmission request buffer including a plurality of transmission buffer areas; a message buffer including a plurality of message buffer areas; a transmission controller configured to transmit data stored in the message buffer to the communication line; and a central processing unit. The central processing unit programmed to search for data with a higher priority than data stored in the message buffer from among pieces of data stored in the transmission request buffer, sequentially search for a vacant buffer area in which no data is stored from among the plurality of message buffer areas, set the data that has been searched for in the vacant buffer area that has been searched for.

14 Claims, 5 Drawing Sheets

ELECTRONIC CONTROL UNIT AND DATA TRANSMISSION METHOD

INCORPORATION BY REFERENCE

The disclosure of Japanese Patent Application No. 2016-240684 filed on Dec. 12, 2016 including the specification, drawings and abstract is incorporated herein by reference in its entity.

BACKGROUND

1. Technical Field

The present disclosure relates to an electronic control unit and a data transmission method.

2. Description of Related Art

In the related art, a data transmission device including an output unit that preferentially outputs data with a high priority using assigned priority information to a bus is known. The data transmission device of the related art includes a plurality of message buffers, and a distribution unit that writes data stored in a transmission buffer to the message buffer with a high area priority when a priority of assigned priority information of the stored data is higher. The output unit preferentially outputs data stored in the message buffer with a high area priority among pieces of data stored in the message buffers to the bus.

With the data transmission device, it is possible to prevent output of the data stored in the message buffer with a high area priority to the bus from being waited until output of data stored in the message buffer with a low area priority to the bus is completed. An example of a related document regarding such a data transmission device may include Japanese Unexamined Patent Application Publication No. 2014-033339 (JP 2014-033339 A).

SUMMARY

In the related art, a message buffer with a high area priority in which data in a group with a high priority according to assigned priority information is stored, and a message buffer with a low area priority in which a message in a group with a low priority is stored are present separately. Therefore, storing the data in a group with a high priority according to the assigned priority information in a message buffer with a high area priority does not wait until the data in the group with a low priority disappears from the message buffer with a low area priority.

However, focusing on individual groups, a retention phenomenon in which storing data with a high priority in a message buffer using assigned priority information in one group is waited until the data with a low priority according to the assigned priority information in one group disappears from the message buffer is likely to occur. The retention phenomenon is likely to occur regardless of a group with a high priority or a group with a low priority according to the assigned priority information.

A countermeasure for increasing the number of message buffers with different area priorities to narrow a range of the priority of the data to be stored in one message buffer is conceivable in order to further suppress the occurrence of such a retention phenomenon. However, in the proposed countermeasure, when a degree of suppression of the occurrence of the retention phenomenon further increases, the number of needed message buffers increases. Thus, it is difficult to further save the number of message buffers.

Accordingly, the present disclosure provides an electronic control device capable of further suppressing occurrence of the retention phenomenon in which storing data with a high priority in a message buffer using assigned priority information is waited until data with a low priority according to the assigned priority information disappears from the message buffer, and further saving the number of message buffers.

A first aspect of the present disclosure relates to an electronic control unit connected to a communication line. The electronic control unit includes a transmission request buffer including a plurality of transmission buffer areas; a message buffer including a plurality of message buffer areas; a transmission controller that is configured to transmit data stored in the message buffer to the communication line; and a central processing unit. The central processing unit is programmed to search for data with a higher priority than data stored in the message buffer from among pieces of data stored in the transmission request buffer, sequentially search for a vacant buffer area in which no data is stored from among the plurality of message buffer areas, set the data that has been searched for in the vacant buffer area that has been searched for.

With the electronic control device of the first aspect of the present disclosure, vacant buffer areas in which no data is stored are sequentially searched for from among the message buffer area by the central processing unit. The data searched for by the central processing unit is set in the vacant buffer area searched by the central processing unit. Therefore, even when there are one or more buffer areas in which data is stored (non-vacant buffer areas) among the message buffer areas, the data searched for by the central processing unit is set in the buffer area other than the non-vacant buffer area (that is, a vacant buffer area). Therefore, data with a high priority in assigned priority information searched for from among the pieces of data stored in the transmission request buffer does not wait until the non-vacant buffer area is changed to the vacant buffer area when the vacant buffer area is searched for, and is stored in the vacant buffer area that has been searched for. Therefore, it is possible to further suppress the occurrence of the retention phenomenon in which storing data with a high priority in the message buffer using assigned priority information is waited until the data with a low priority according to the assigned priority information disappears from the message buffer.

Further, with the electronic control unit of the first aspect of the present disclosure, vacant buffer areas in which data searched for by the central processing unit is set are sequentially searched for from among the message buffer areas. Therefore, the buffer area in which the data searched for by central processing unit is set is not fixed to a specific buffer among the message buffer areas and is dynamically changed. Thus, since it is not needed to prepare the same number of message buffer areas as the transmission buffer areas, it is possible to reduce the number of message buffer areas relative to the number of transmission buffer areas. Therefore, it is possible to further save the number of message buffer areas.

In the electronic control unit of the first aspect of the present disclosure, the electronic control unit may further include a management buffer. The central processing unit may be programmed to store data presence or absence information indicating any one of a data presence state in which data is stored and a data absence state in which no data is stored in the management buffer with respect to each of the message buffer areas, change the state of the data presence or absence information from the data absence state to the data presence state with respect to the buffer area of which data is set among the message buffer areas, change the state of the data presence or absence information from the data presence state to the data absence state with respect to the buffer area of which transmission of data to the communication line has been completed among the message buffer areas, and search for the vacant buffer area in which no data is stored from among the message buffer areas based on whether the state of the data presence or absence information is the data presence state or the data absence state.

According to the first aspect of the present disclosure, it is possible to easily manage whether each of the message buffer areas is in a data presence state in which data is stored or in a data absence state in which no data is stored. Therefore, the central processing unit can easily search for the vacant buffer area in which no data is stored from among the message buffer areas.

In the electronic control unit of the first aspect of the present disclosure, the central processing unit may be programmed to search for data with the highest priority among the pieces of data stored in the transmission request buffer.

With the electronic control unit of the first aspect of the present disclosure, vacant buffer areas in which no data is stored are sequentially searched for from among the message buffer areas by the central processing unit. Data with the highest priority among the pieces of data stored in the transmission request buffer is set in the vacant buffer area searched by the central processing unit. Therefore, even when there are one or more non-vacant buffer areas among the message buffer areas, the data with the highest priority among the pieces of data stored in the transmission request buffer is set in the vacant buffer area. Therefore, the data with the highest priority among the pieces of data stored in the transmission request buffer does not wait until the non-vacant buffer is changed to the vacant buffer when the vacant buffer area is searched for, and is stored in the vacant buffer area that has been searched for. Therefore, it is possible to further suppress the occurrence of the retention phenomenon in which storing the data with the highest priority among the data stored in the transmission request buffer in the message buffer is waited until data with a low priority according to the assigned priority information disappears from the message buffer.

In the electronic control unit of the first aspect of the present disclosure, the transmission controller may be configured to transmit the data with the highest priority among the pieces of data stored in the message buffer to the communication line.

According to the first aspect of the present disclosure, the data with the highest priority among the message buffer is transmitted to the communication line. Therefore, it is possible to further suppress occurrence of a transmission retention phenomenon in which transmission of the data with the highest priority in the assigned priority information stored in the message buffer is waited until transmission of the data with a low priority in the assigned priority information stored in the message buffer the transmission is completed.

According to the first aspect of the present disclosure, it is possible to further suppress occurrence of a retention phenomenon in which storing data with a high priority using assigned priority information in the message buffer is waited until data with a low priority according to the assigned priority information disappears from the message buffer, and further save the number of message buffer areas.

A second aspect of the present disclosure relates to a data transmission method of transmitting data from an electronic control unit that is connected to a communication line and that includes a transmission request buffer including a plurality of transmission buffer areas and a message buffer including a plurality of message buffer areas, a central processing unit and a transmission controller to the communication line. The data transmission method includes searching for, by the central processing unit, data with a higher priority than data stored in the message buffer from among pieces of data stored in the transmission request buffer, sequentially searching for, by the central processing unit, a vacant buffer areas in which no data is stored from among the message buffer areas, setting, by the central processing unit, the data that has been searched for in the vacant buffer area that has been searched for, and transmitting, by the transmission controller, the data stored in the message buffer to the communication line.

In the data transmission method of the second aspect of the present disclosure, may further include, storing data presence or absence information indicating any one of a data presence state in which data is stored and a data absence state in which no data is stored in a management buffer included in the electronic control unit with respect to each of the message buffer areas by the central processing unit, changing the state of the data presence or absence information from the data absence state to the data presence state with respect to a buffer area in which data is set among the message buffer areas by the central processing unit, and changing the state of the data presence or absence information from the data presence state to the data absence state with respect to the buffer area of which transmission of data to the communication line has been completed among the message buffer areas by the central processing unit. The vacant buffer area in which no data is stored may be searched for from among the message buffer areas based on whether the state of the data presence or absence information is the data presence state or the data absence state by the central processing unit.

In the data transmission method of the second aspect of the present disclosure, data with the highest priority may be searched for among the pieces of data stored in the transmission request buffer by the central processing unit.

In the data transmission method of the second aspect of the present disclosure, the data with the highest priority among the pieces of data stored in the message buffer may be transmitted to the communication line by the central processing unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments according to the present disclosure will be described with reference to the drawings.

Figure 1:
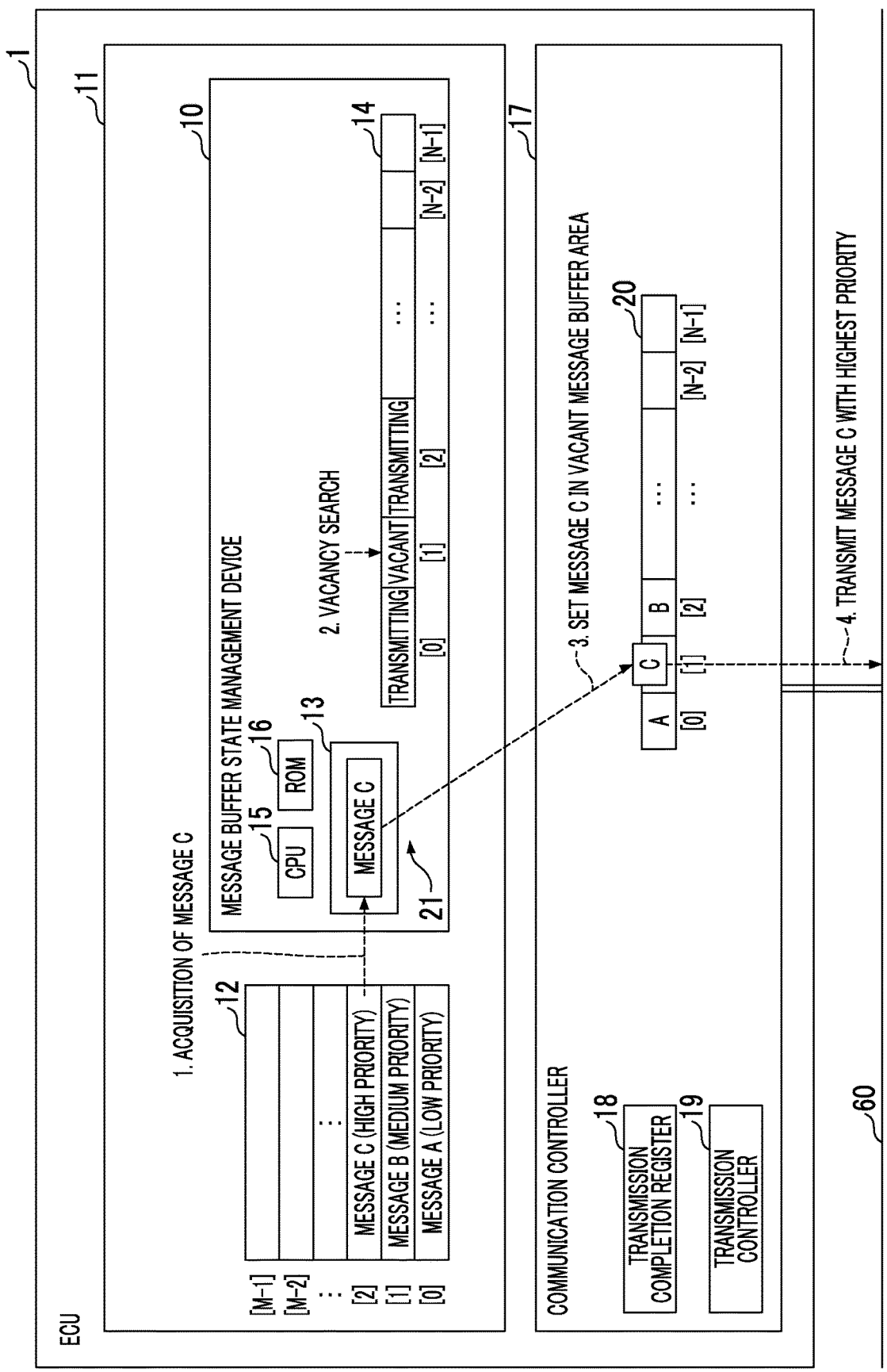
FIG. 1 is a diagram illustrating an example of a hardware configuration of an electronic control unit that performs data transmission and an operation of the electronic control unit.

FIG. 1 is a diagram illustrating an example of a hardware configuration of an electronic control unit that performs data transmission and an operation of the electronic control unit. A transmission electronic control unit (ECU) 1 is an example of an electronic control unit that is connected to a communication line, and a communication bus 60 is an example of the communication line. The transmission ECU 1 and the communication bus 60 are mounted on a vehicle. At least one reception device (not illustrated) such as a reception ECU that receives data that the transmission ECU 1 has transmitted to the communication bus 60 is connected to the communication bus 60. In the communication system illustrated in FIG. 1, transmission and reception of data between the transmission ECU 1 and the reception ECU are performed by a control area network (CAN) communication.

The transmission ECU 1 is connected to the communication bus 60 and transmits a message to the communication bus 60. The message is an example of data. The reception ECU is connected to the communication bus 60 and receives the message from the communication bus 60. The communication bus 60 is a transfer path through which a message transmitted and received between the transmission ECU 1 and the reception ECU is transferred.

The transmission ECU 1 is an example of an electronic control unit including a microcomputer 11 and a communication controller 17. The microcomputer 11 is an example of a microcomputer including a transmission request buffer 12 and a message buffer state management device 10 (hereinafter referred to as a "management device 10"). The communication controller 17 is a hardware device that controls transmission and reception of messages between the microcomputer 11 and the communication bus 60. The communication controller 17 includes a transmission completion register 18, a transmission controller 19, and a transmission message buffer 20.

The transmission request buffer 12 is a storage area in which a message requested from a predetermined upper application program for the transmission ECU 1 to transmit to the communication bus 60 is stored. The upper application program is a program to be executed in the transmission ECU 1 or a program to be executed in an ECU other than the transmission ECU 1.

The transmission request buffer 12 includes a plurality of transmission buffer area [j]. Here, j indicates a non-negative integer. In FIG. 1, M transmission buffer areas [0] to [M-1] are illustrated. M indicates a positive integer. FIG. 1 illustrates an example of a state in which a message A of which the priority of the assigned priority information is low is stored in the transmission buffer area[0], a message B of which the priority of the assigned priority information is medium is stored in the transmission buffer area [1], and a message C of which the priority of the assigned priority information is high is stored in the transmission buffer area [2].

The priority assigned to each message indicates a priority in communication mediation that is performed with other messages that are transferred on the communication bus 60. For example, an identification number assigned to each message indicates a priority in the communication mediation, and it is indicated that as a value of the identification number decreases, the priority of the assigned priority information in the communication mediation increases (that is, it is easy to win in the communication mediation with the other messages). A specific example of the identification number may include well-known CAN ID.

The management device 10 manages a state of the transmission message buffer 20. The transmission message buffer 20 is a storage area in which a message to be transmitted to the communication bus 60 is temporarily stored before the message is transmitted to the communication bus 60. The transmission message buffer 20 includes a plurality of message buffer areas [i]. Here, i indicates a non-negative integer. In FIG. 1, N message buffer areas [0] to [N-1] are illustrated. N indicates a positive integer smaller than M. The management device 10 manages whether respective states of each of the plurality of message buffer areas [i] is "transmitting" or "vacant".

The management device 10 includes a central processing unit (CPU) 15 which is an example of a processor, a read only memory (ROM) 16, and a random access memory (RAM) 21. The RAM 21 includes a holding buffer 13 and a management buffer 14.

The holding buffer 13 is a storage area in which the message acquired from the transmission request buffer 12 is temporarily stored.

The management buffer 14 is a storage area in which internal held information [i] indicating any one of a data presence state in which data is stored and a data absence state in which no data is stored is stored for the respective message buffer areas [i]. The internal held information [i] is an example of the data presence or absence information.

A state in which the internal held information [i] is "transmitting" indicates a data presence state, that is, a state in which data is stored in the message buffer area [i] having the same index i as the internal held information [i]. More specifically, a state in which a message stored in the message buffer area [i] having the same index i as the internal held information [i] has not been transmitted to the communication bus 60 is defined as "transmitting".

On the other hand, a state in which the internal held information [i] is "vacant" indicates a data absence state, that is, a state in which no data is stored in the message buffer area [i] having the same index i as the internal held information [i]. More specifically, a state in which no message is stored in the message buffer area [i] having the same index i as the internal held information [i] is defined as "vacant".

Figure 2:
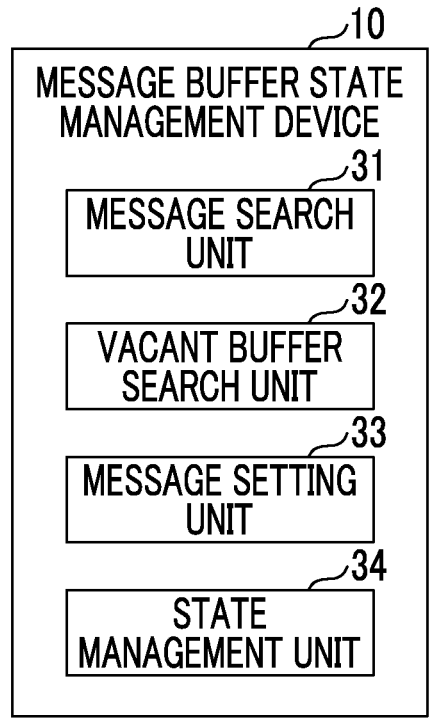
FIG. 2 is a diagram illustrating an example of a functional configuration of a message buffer state management device.

FIG. 2 is a diagram illustrating an example of a functional configuration of a message buffer state management device. The management device 10 includes a message search unit 31, a vacant buffer search unit 32, a message setting unit 33, and a state management unit 34. Hereinafter, a processing function of each unit will be described with reference to FIG. 1.

The message search unit 31 is included in the electronic control unit. The message search unit 31 searches for a message having a higher priority than the messages stored in the N message buffer areas [0] to [N-1] in the transmission message buffer 20 from among the messages stored in the M transmission buffer areas [0] to [M-1] in the transmission request buffer 12. The message search unit 31 searches for, for example, the message with the highest priority among the messages stored in the M transmission buffer areas [0] to [M-1].

The vacant buffer search unit 32 is included in the electronic control unit. The vacant buffer search unit 32 sequentially searches for the vacant buffer area in which no data is stored from among the N message buffer areas [0] to [N−1].

The message setting unit 33 is included in the electronic control unit. The message setting unit 33 sets the message searched by the message search unit 31 in the vacant buffer area searched by the vacant buffer search unit 32.

The state management unit 34 is included in the electronic control unit. The state management unit 34 changes the state of the internal held information [i] from "vacant" to "transmitting" with respect to the buffer in which the message is set by the message setting unit 33 among the N message buffer areas [0] to [N−1]. On the other hand, the state management unit 34 changes the state of the internal held information [i] from "transmitting" to "vacant" with respect to the buffer of which transmission of the message to the communication bus 60 has been completed by the transmission controller 19 among the N message buffer areas [0] to [N−1].

Thus, the vacant buffer search unit 32 can search for the vacant buffer area in which no message is stored from among the N message buffer areas [0] to [N−1] based on whether the state of the internal held information [i] is "vacant" or "transmitting".

Processing functions of the respective units of the message search unit 31, the vacant buffer search unit 32, the message setting unit 33, and the state management unit 34 are realized by the CPU 15 executing the program stored in the ROM 16. The program includes a program for causing the CPU 15 to execute a process procedure. The RAM 21 stores various types of data including intermediate data of calculation using the program executed by the CPU 15.

In FIG. 1, the transmission controller 19 controls transmission of the message (hereinafter referred to as "message X") stored in the transmission message buffer 20 to the communication bus 60. The messages A, B, C are examples of message X. When the message X is stored in the transmission message buffer 20, the transmission controller 19 tries to transmit the message X stored in the transmission message buffer 20 to the communication bus 60. The transmission controller 19 stores a transmission completion data indicating that the transmission of the message X to the communication bus 60 has been completed in the transmission completion register 18 when the message X has won at communication mediation with other messages to be transferred on the communication bus 60. The transmission completion register 18 is an example of a data storage unit. The transmission completion data is also referred to as transmission completion flag data. The communication controller 17 includes the transmission completion register 18 with respect to each of the N message buffer areas [0] to [N−1].

When the transmission controller 19 completes the transmission of the message X to the communication bus 60, the transmission controller 19 stores the transmission completion data indicating that the transmission of the message X to the communication bus 60 has been completed, in the transmission completion register 18 for the message X of which the transmission has been completed. On the other hand, the transmission controller 19 deletes the transmission completion data from the transmission completion register 18 from storing the transmission completion data for the message X in the transmission completion register 18 for the message X of which the transmission has been completed to the next execution of transmission of the message to the communication bus 60.

Further, when the transmission of the message X to the communication bus 60 is completed, the message buffer area [i] in which the message X of which the transmission has been completed has been stored becomes "vacant".

Next, an operation example of the transmission ECU 1 will be described with reference to FIG. 1.

A prerequisite of one operation example is a situation that the transmission to the communication bus 60 is not completed due to losing in the communication mediation with the message A with a low priority stored in the message buffer area [0] and the message B with a medium priority stored in the message buffer area [2]. In this situation, an operation example after the message C with a high priority is stored in the transmission buffer area [2] of the transmission request buffer 12 will be described.

The message search unit 31 acquires the message with a higher priority than the messages stored in the N message buffer areas [0] to [N−1] in the transmission message buffer 20 from among the messages stored in the M transmission buffer areas [0] to [M−1] in the transmission request buffer 12. In this case, the message search unit 31 acquires the message C with a higher priority than the message A, B stored in the message buffer areas [0] [2] among the messages A, B, C stored in the transmission buffer area [0] [1] [2], and stores the message C in the holding buffer 13. The messages acquired from the transmission buffer disappear from the transmission buffer.

The vacant buffer search unit 32 specifies that the message buffer area [1] is a vacant buffer area based on the internal held information [i] stored in the management buffer 14. The message setting unit 33 sets the message C searched for by the message search unit 31 in the vacant message buffer area [1] searched for by the vacant buffer search unit 32.

The transmission controller 19 transmits the message with the highest priority among the messages stored in the message buffer areas [0] to [N−1] to the communication bus 60. Thus, the transmission controller 19 can transmit the message C with the highest priority among the messages A, C, B stored in the message buffer areas [0] [1] [2] to the communication bus 60 earlier than the messages A, B.

Therefore, it is possible to further suppress the occurrence of the retention phenomenon in which storing the message C with the highest priority in the transmission message buffer 20 is waited until the messages A, B with a relatively low priority disappear from the transmission message buffer 20.

Further, it is possible to further suppress the occurrence of the transmission retention phenomenon in which transmission of the message C with the highest priority stored in the transmission message buffer 20 is waited until transmission of the messages A, B with a relatively low priority stored in the transmission message buffer 20 is completed.

Figure 3:
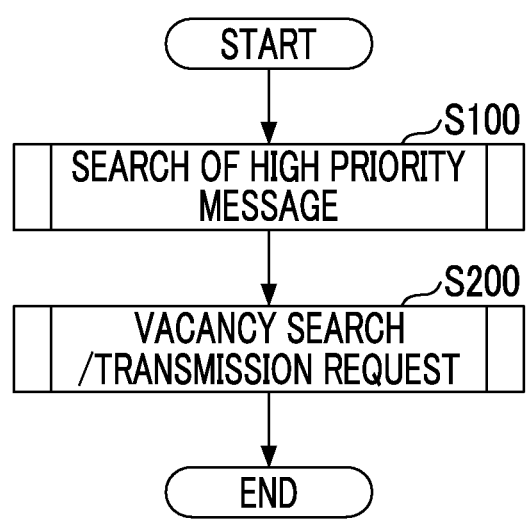
FIG. 3 is a flowchart illustrating an example of a flow of an operation of an electronic control unit.

FIG. 3 is a flowchart illustrating an example of a flow of an operation of the electronic control unit that performs data transmission. The management device 10 of the transmission ECU 1 which is an example of the electronic control unit periodically repeats a process from start to end illustrated in FIG. 3.

When transmission of a message to the communication bus 60 is needed, the management device 10 executes a process of searching for the high priority message in step S100, and then, executes a vacancy search/transmission request process in step S200.

Figure 4:
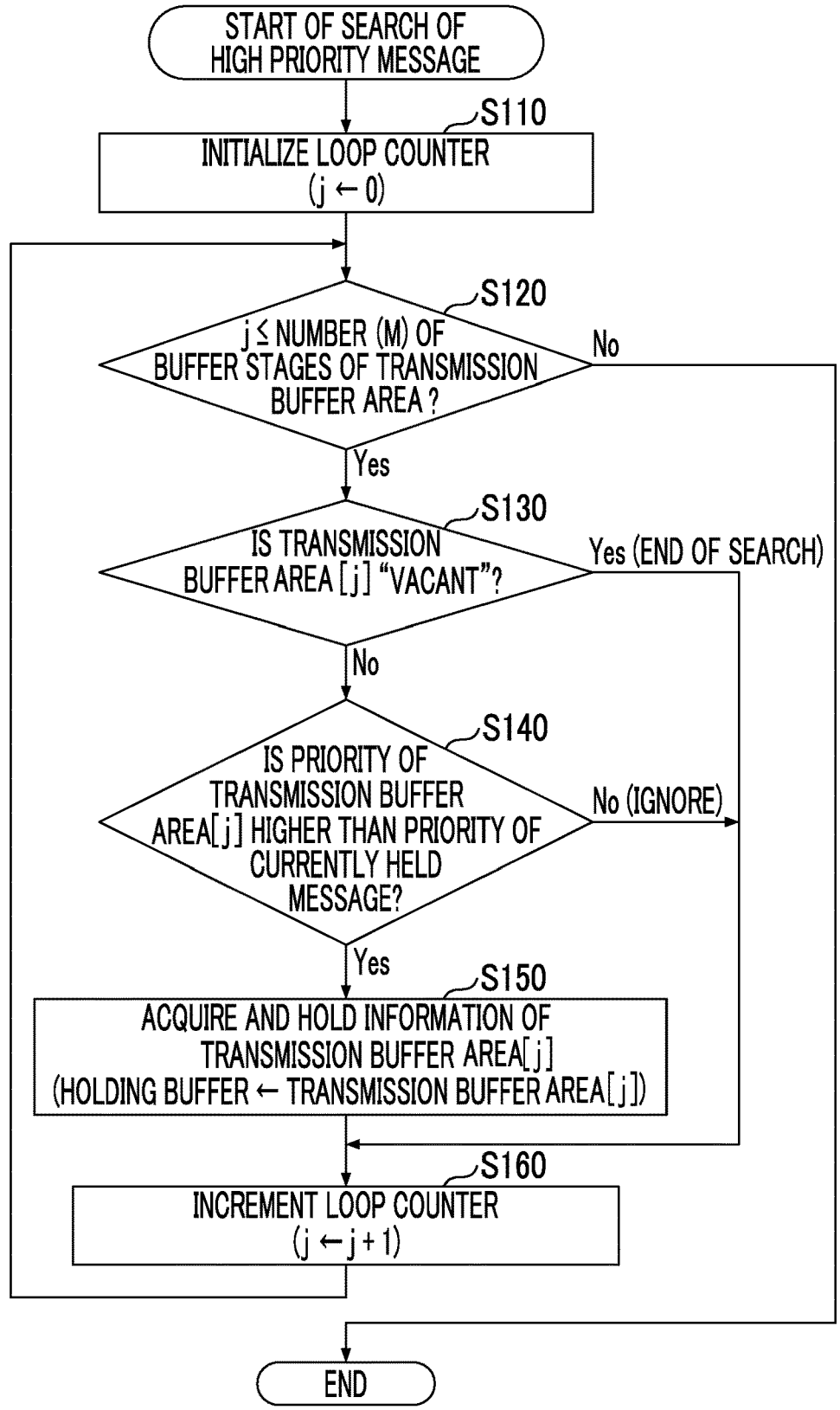
FIG. 4 is a flowchart illustrating an example of a flow of a process of searching for a high priority message.

FIG. 4 is a flowchart illustrating an example of a flow of a process of searching for a high priority message.

In step S110, the message search unit 31 of the management device 10 sets j to zero to initialize a loop counter.

In step S120, the message search unit 31 determines whether or not j is equal to or smaller than the number M of buffer stages of the transmission buffer area [j]. When the message search unit 31 determines that j is equal to or smaller than the number M of buffer stages of the transmission buffer area [j], the message search unit 31 executes a process of step S130.

In step S130, the message search unit 31 determines whether or not the transmission buffer area [j] is "vacant". When the transmission buffer area [j] is "vacant" (Yes in step S130), the message is not stored in the transmission buffer area [j] and therefore, the message search unit 31 increments j by one to determine whether or not another transmission buffer area is vacant through search (step S160). The message search unit 31 executes the process of step S120 after the increment of j.

On the other hand, the message search unit 31 determines that the transmission buffer area [j] is not "vacant" (No in step S130), the message is stored in the transmission buffer area [j]. In this case, the message search unit 31 executes a process of step S140.

In step S140, the message search unit 31 determines whether or not the priority stored in the transmission buffer area [j] is higher than the priority of the message currently stored in the holding buffer 13.

When the priority stored in the transmission buffer area [j] is higher than the priority of the message currently stored in the holding buffer 13, the message search unit 31 acquires the message stored in the transmission buffer area [j]. The message search unit 31 replaces the message currently stored in the holding buffer 13 with the acquired message (step S150). After step S150, the message search unit 31 increments j by one to search for another transmission buffer area (step S160).

On the other hand, when the priority stored in the transmission buffer area [j] is not higher than the priority of the message currently stored in the holding buffer 13, the message search unit 31 executes the process of step S160 without acquiring the message from the transmission buffer area [j].

After the process of step S160, the process of step S120 is executed again. In step S120, when the message search unit 31 determines that the index j has exceeded the number M of buffer stages of the transmission buffer area [j], this means that all of the M transmission buffer areas [0] to [M−1] have been searched, and therefore, the process of searching for a high priority message is ended.

When the process of searching for the high priority message is ended, the message with the highest priority among the messages stored in the M transmission buffer areas [0] to [M−1] is stored in the holding buffer 13. After the process of searching for the high priority message is ended, a vacancy search/transmission request process (FIG. 5) is executed.

Figure 5:
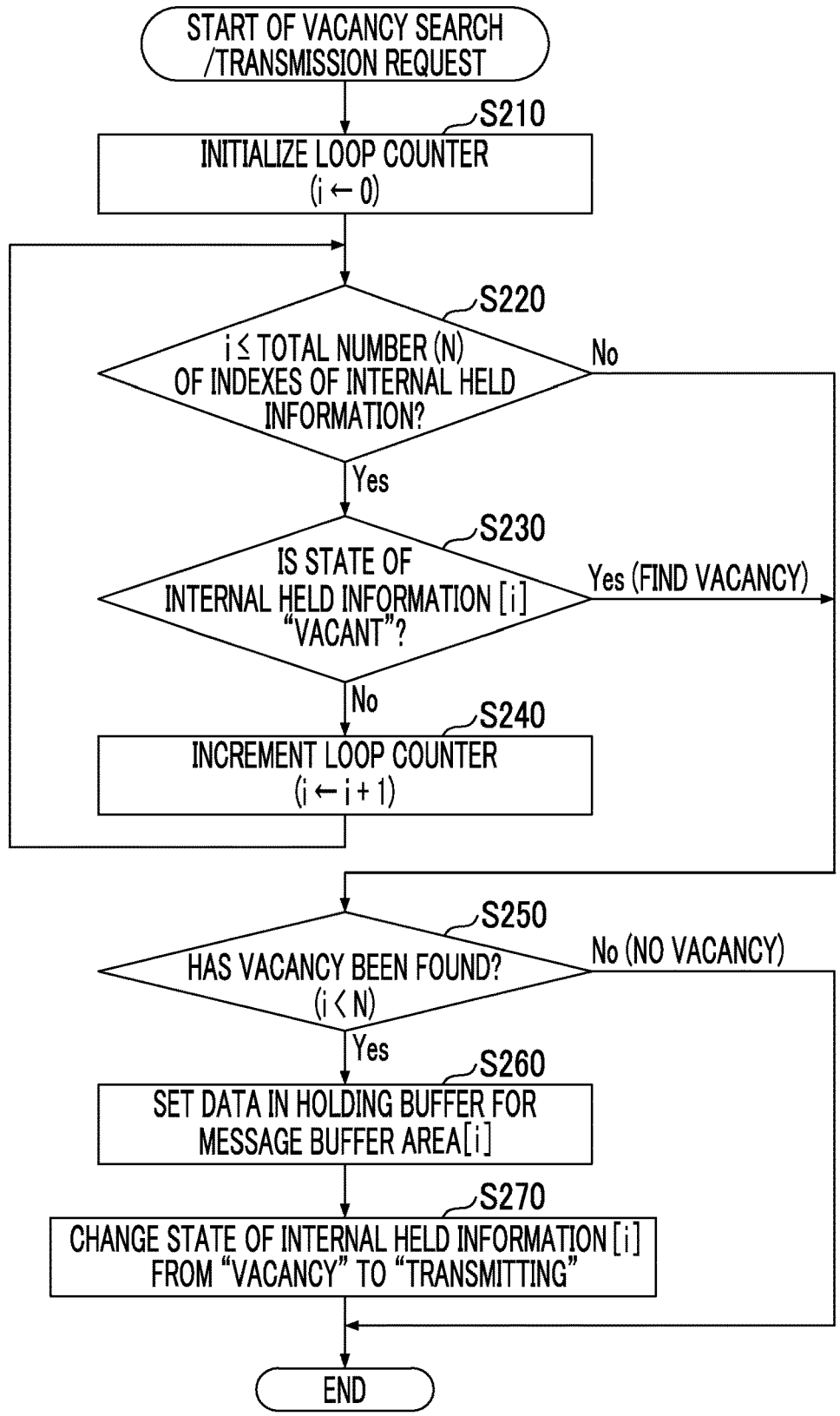
FIG. 5 is a flowchart illustrating an example of a flow of a vacancy search/transmission request process.

FIG. 5 is a flowchart illustrating an example of a flow of a vacancy search/transmission request process.

In step S210, the vacant buffer search unit 32 of the management device 10 sets i to zero to initialize the loop counter.

In step S220, the vacant buffer search unit 32 determines whether or not i is equal to or smaller than a total number N of indexes of the internal held information [i]. When the vacant buffer search unit 32 determines that i is equal to or smaller than the total number N of indexes of the internal held information [i], the vacant buffer search unit 32 executes a process of step S230.

In step S230, the vacant buffer search unit 32 determines whether or not the state of the internal held information [i] is "vacant". When the internal held information [i] is not "vacant" (No in step S230), this means that the message is stored in the message buffer area [i]. Therefore, the vacant buffer search unit 32 increments i by one to search for a vacancy of the message buffer area [i] at another place (step S240).

The vacant buffer search unit 32 executes the process of step S220 again after increment of i. When the vacant buffer search unit 32 determines that i has exceeded the total number N of indexes of the internal held information [i] in step S220 (No in step S220), this means that all vacancies of the N message buffer area [0] to [N−1] have been searched. In this case, a process of step S250 is executed.

On the other hand, when the vacant buffer search unit 32 determines that the state of the internal held information [i] is "vacant" in step S230 (Yes in step S230), the vacant buffer search unit 32 executes the process of step S250 without executing step S240. That is, even when there is the message buffer area [i] not yet searched to determine whether or not the message buffer is vacant, the process of step S250 is executed.

In step S250, the vacant buffer search unit 32 determines whether or not the vacancy has been found in any one of the N message buffer areas [0] to [N−1]. When i is smaller than N, the vacant buffer search unit 32 determines that the vacancy has been found in the i-th message buffer.

In step S260, the message setting unit 33 sets the message currently held in the holding buffer 13 in the vacant buffer area (the i-th message buffer area) searched by the vacant buffer search unit 32. In step S270, the state management unit 34 changes the state of the internal held information [i] having the same index i as the i-th message buffer area from "vacant" to "transmitting". Thereafter, step S100 in FIG. 3 is resumed.

On the other hand, in step S250, when i is equal to or greater than N, the vacant buffer search unit 32 determines that there is no vacancy in all of the message buffer areas [i]. Thereafter, step S100 in FIG. 3 is resumed.

Figure 6:
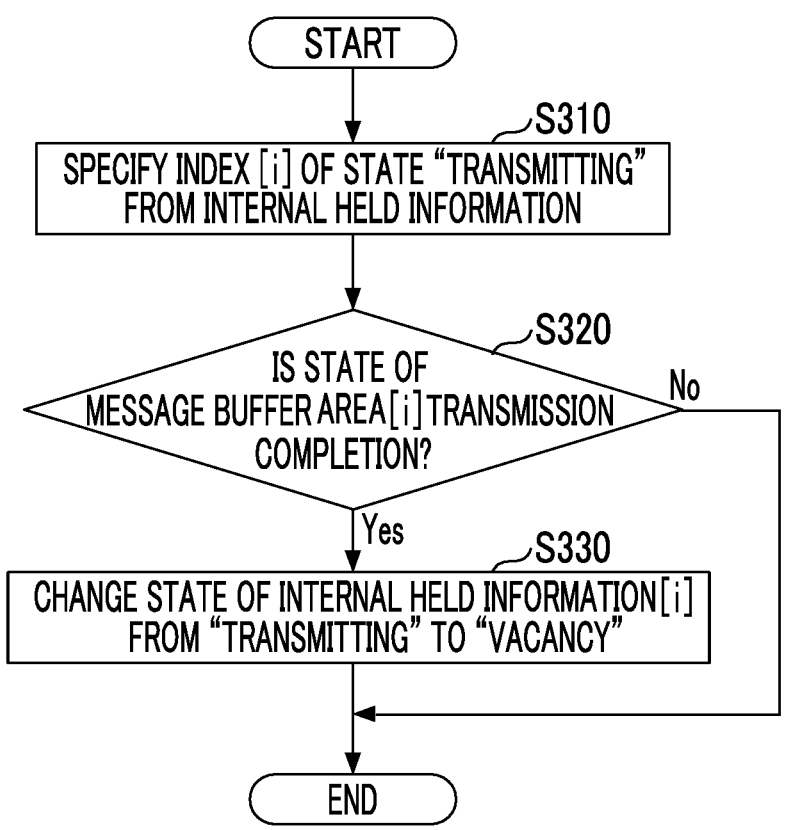
FIG. 6 is a flowchart illustrating an example of a flow of a transmission completion process.

FIG. 6 is a flowchart illustrating an example of a flow of a transmission completion process. The state management unit 34 periodically repeats a process from start to end illustrated in FIG. 6.

In step 310, the state management unit 34 specifies the index i in which the internal held information [i] is "transmitting".

In step S320, the state management unit 34 determines whether or not the transmission completion data is stored in the transmission completion register 18 of the message buffer area [i] with the index i specified in step S310. When the transmission completion data is stored in the transmission completion register 18 of the message buffer area [i] with the index i specified in step S310, the state management unit 34 changes the state of the internal held information [i] from "transmitting" to "vacancy". When the transmission completion data is not stored in the transmission completion register 18 of the message buffer area [i] with the index i specified in step S310, the state management unit 34 maintains the state of the internal held information [i] to be "transmitting".

Thus, with the electronic control unit according to the embodiment, the vacant buffer area in which no message is stored is sequentially searched for by the vacant buffer search unit 32 from among the plurality of the message buffer areas [i]. Data searched for by the message search unit 31 is set in the vacant buffer searched for by the vacant buffer search unit 32. Therefore, even when one or more buffer areas in which the message is stored (non-vacant buffer areas) are present among the plurality of the message buffer areas [i], the data searched for by the message search unit 31 is set in a buffer area (that is, a vacant buffer area) other than the non-vacant buffer area. Therefore, the data with a high priority in the assigned priority information searched for from among the messages stored in the plurality of the transmission buffer areas [j] does not wait until the non-vacant buffer is turned to a vacant buffer when the vacant buffer area is searched, and is stored in the searched vacant buffer area. Therefore, it is possible to further suppress the occurrence of the retention phenomenon in which storing the data with a high priority in the message buffer using assigned priority information is waited until the data with a low priority according to the assigned priority information disappears from the message buffer.

Further, with the electronic control unit according to the embodiment, the vacant buffer area in which the message searched for by the message search unit 31 is set is sequentially searched from among the plurality of the message buffer areas [i]. Therefore, the buffer areas in which the messages searched for by the message search unit 31 have been set is not fixed to a specific buffer area among the plurality of the message buffer areas [i] and is dynamically changed. Thus, since it is not needed to prepare the same number of message buffer areas as the transmission buffer areas [j], it is possible to reduce the number of message buffer areas [i] relative to the number of transmission buffers area [j]. Therefore, it is possible to save the number of message buffer areas [i].

While the electronic control unit that performs data transmission has been described using the embodiments, the present disclosure is not limited to the embodiments. Various modifications and improvements such as a combination or a substitution of some or all of the other embodiments can be made within the scope of the present disclosure.

What is claimed is:

1. A transmitter connected to a communication line, comprising:
   a plurality of transmission request buffers configured to store messages requested to be transmitted to the communication line;
   a plurality of transmission message buffers configured to temporarily store the messages before the messages are transmitted to the communication line;
   a data search unit configured to search for a message with a higher priority than that of the messages stored in the plurality of transmission message buffers among the messages stored in the plurality of transmission request buffers;
   a management buffer configured to store, for each of the plurality of transmission message buffers, message presence/absence information indicating either one of a message present state in which a message is stored and a message absent state in which a message is not stored;
   a vacant buffer search unit configured to repeat sequentially searching for a vacant buffer area in which no message is stored from among the plurality of transmission message buffer areas by referring to the management buffer until the vacant buffer area is searched for;
   a data setting unit configured to set the message that has been searched for by the data search unit in the vacant buffer area that has been searched for by the buffer search unit; and
   a transmission controller configured to transmit the messages stored in the plurality of transmission message buffers to the communication line.

2. The transmitter according to claim 1, further comprising a state management unit configured to change a state of the message presence/absence information from the message absent state to the message present state for the buffer in which the message is set by the data setting unit among the plurality of transmission message buffers, and change the status of the message presence/absence information from the message present state to the message absent state for the buffer in which the transmission of the message to the communication line has been completed by the transmission controller among the plurality of transmission message buffers, wherein
   the vacant buffer search unit is configured to search for a vacant buffer area in which no message is stored from among the plurality of transmission message buffers based on whether the state of the message presence/absence information is the message present state or the message absent state.

3. The transmitter according to claim 2, wherein the data search unit is configured to search for a message with a highest priority among the messages stored in the plurality of transmission request buffers.

4. The transmitter according to claim 2, wherein the transmission controller is configured to transmit the message with the highest priority among the messages stored in the plurality of transmission message buffers to the communication line.

5. The transmitter according to claim 2, further comprising a holding buffer in which the message searched by the data search unit is stored, wherein
   the data setting unit is configured to set the message stored in the holding buffer in the vacant buffer area searched by the vacant buffer search unit.

6. The transmitter according to claim 1, wherein the data search unit is configured to search for a message with a highest priority among the messages stored in the plurality of transmission request buffers.

7. The transmitter according to claim 6, wherein the transmission controller is configured to transmit the message with the highest priority among the messages stored in the plurality of transmission message buffers to the communication line.

8. The transmitter according to claim 6, further comprising a holding buffer in which the message searched by the data search unit is stored, wherein
   the data setting unit is configured to set the message stored in the holding buffer in the vacant buffer area searched by the vacant buffer search unit.

9. The transmitter according to claim 1, wherein the transmission controller is configured to transmit the message with the highest priority among the messages stored in the plurality of transmission message buffers to the communication line.

10. The transmitter according to claim 9, further comprising a holding buffer in which the message searched by the data search unit is stored, wherein
    the data setting unit is configured to set the message stored in the holding buffer in the vacant buffer area searched by the vacant buffer search unit.

11. The transmitter according to claim 1, further comprising a holding buffer in which the message searched by the data search unit is stored, wherein the data setting unit is configured to set the message stored in the holding buffer in the vacant buffer area searched by the vacant buffer search unit.

12. The transmitter according to claim 11, wherein the data search unit is configured to acquire a message with a higher priority than that of the message stored in the holding buffer from the transmission request buffer, and replaces the message stored in the holding buffer with the acquired message.

13. The transmitter according to claim 12, wherein the data search unit is configured to sequentially perform, for each of the plurality of transmission request buffers, the steps of: comparing a priority of the message stored in one of the plurality of transmission request buffers with a priority of the message stored in the holding buffer, and replacing the message stored in the holding buffer with the message stored in the one of the transmission request buffers when the priority of the message stored in the one of the transmission request buffers is higher than the priority of the message stored in the holding buffer.

14. The transmitter according to claim 11, wherein the data search unit is configured to sequentially perform, for each of the plurality of transmission request buffers, the steps of: comparing a priority of the message stored in one of the plurality of transmission request buffers with a priority of the message stored in the holding buffer, and replacing the message stored in the holding buffer with the message stored in the one of the transmission request buffers when the priority of the message stored in the one of the transmission request buffers is higher than the priority of the message stored in the holding buffer.

* * * * *